J. A. ZEMAN.
ARMOR FABRIC.
APPLICATION FILED DEC. 9, 1909.
952,859.
Patented Mar. 22, 1910.
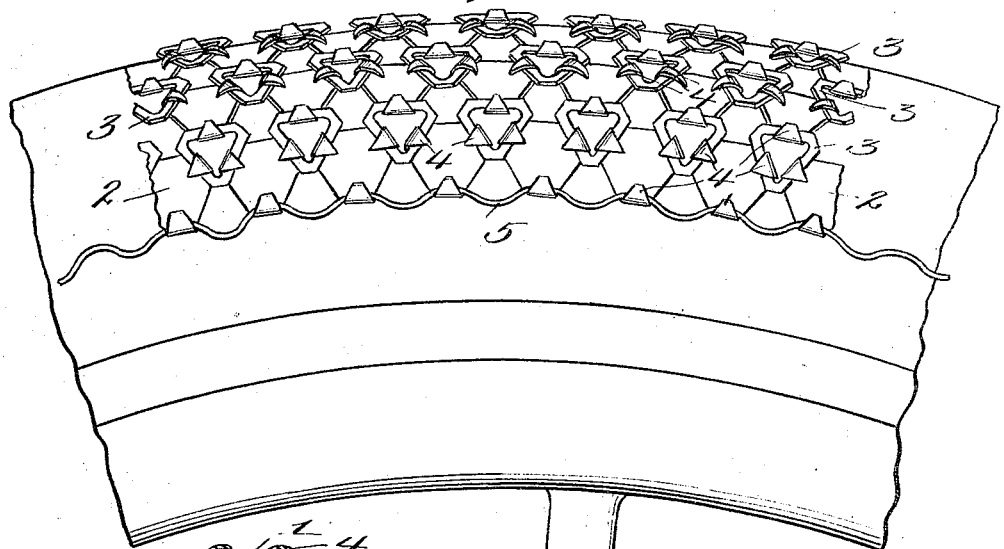
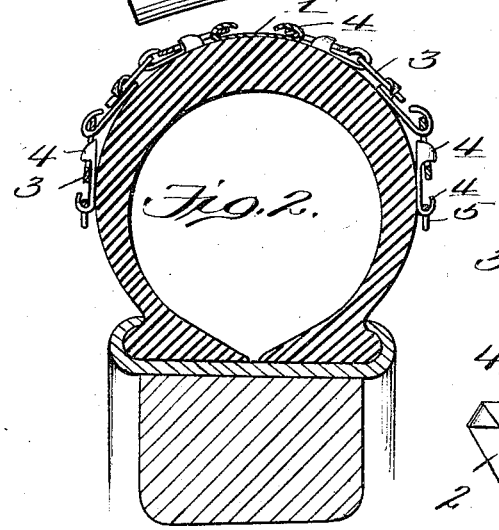
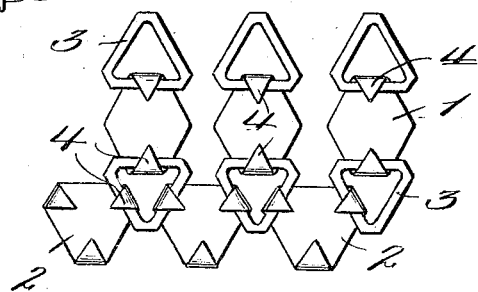
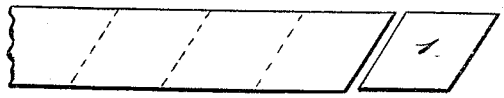
Witnesses:
G. W. Kesler
L. B. Keefer
Inventor
Joseph A. Zeman
By James L. Norris
Atty.

UNITED STATES PATENT OFFICE.

JOSEPH A. ZEMAN, OF TOBIAS, NEBRASKA.

ARMOR FABRIC.

952,859.      Specification of Letters Patent.    Patented Mar. 22, 1910.

Application filed December 9, 1909. Serial No. 532,148.

*To all whom it may concern:*

Be it known that I, JOSEPH A. ZEMAN, a citizen of the United States, residing at Tobias, in the county of Saline and State of Nebraska, have invented new and useful Improvements in Armor Fabric, of which the following is a specification.

This invention relates to new and useful improvements in armor fabrics for pneumatic tires and more particularly to that type of construction which embodies a series of interconnected armor plates, the connecting devices having such construction and relation that the resultant product is a flexible metallic armor fabric.

One object of the present invention is to provide an armor fabric which shall be readily applicable to tires of different standard diameters and widths. In a number of the known constructions the relation of the parts is such that the fabric is applicable to only one size tire; that is to say, the fabric when used upon a tire of given size, will fit the tread thereof smoothly and evenly, but when it is attempted to use the fabric upon a tire of larger or smaller size, the fabric will not fit the tire smoothly and evenly but, in the case of a small tire, will be too loose and in the case of a large tire, its fit will be irregular and buckling.

The construction of the present armor fabric is such that it may be aptly termed "self-adjusting," since the parts adjust themselves to proper positions with relation to one another, in accordance with the size of the tire upon which the fabric is placed and the armor as an entirety fits smoothly and evenly on the tire without looseness or buckling.

A further object of the invention is the provision of an armor fabric in which the parts thereof may be inexpensively produced from sheet metal without a waste of material. The parts so produced shall be hereinafter referred to as armor "units."

An embodiment of the invention is illustrated in the accompanying drawings, wherein—

Figure 1 is an elevation showing the fabric applied to a tire; Fig. 2 is a cross section of a tire with the fabric thereon; Fig. 3 is a detail plan view of the fabric; Figs. 4 and 5 are diagrams showing the manner in which the armor units may be formed from strips of sheet material.

Similar characters of reference designate corresponding parts throughout the several views.

The improved armor fabric consists essentially of armor units and connecting devices therefor. These units are arranged in circumferential rows, the units of the central row being diamond-shaped and designated by the numeral 1, and the units of the rows on each side of the central row being of triangular shape and designated by the numeral 2. The mutually adjacent units of each row are connected to one another and to the adjacent units of the row on each side thereof, by rings, as 3, which are also of triangular shape. The apices of the units are overturned so as to afford hooks 4, which engage over the straight sides of the rings 3. The outermost line of hooks 4 at each side of the fabric engage over the retaining rings, as 5, by which the fabric as an entirety is secured upon the tread of the tire, the rings 5 being of general annular form and being preferably convoluted, as shown in Fig. 1. The armor fabric thus constructed has a smooth surface and a rough surface. The rough surface is the one which presents the hooks 4 and the connecting rings, and the smooth surface is the one which presents simply the smooth faces of the armor units. The fabric is placed upon the tire with its smooth surface against the tread face of the tire and its rough surface exposed. This rough surface is effective in resisting skidding and the fabric therefore has a two-fold character; that is to say, it is both an armoring and an anti-skidding device.

Owing to the form of the armor units, they may be very easily and inexpensively produced by shearing the same from strips or plates of sheet metal, Fig. 4 showing a strip of sheet metal and indicating by parallel dotted lines, the shearing lines of the diamond-shaped units 1, and Fig. 5 showing a strip of sheet metal and indicating by angularly disposed dotted lines, the shearing lines of the triangular units 2. Aside from the cheapness with which the units may be produced, their particular form is of advantage in that it provides for the ready formation of the necessary retaining hooks, these, as stated, being afforded by simply overturning the apex portions of the units.

It will be observed that the connecting rings 3 have straight sides and that the walls of the hooks 4 are also straight. The straight sides of the connecting rings are of materially greater length than the walls of the hooks and consequently, some degree of slidable play between the rings and the units hooked thereto is provided for. The play thus provided for is utilized in changing the fabric from a tire of one size to a tire of another size. In such a case the armor units position themselves in such relation to one another as to fit evenly and smoothly against the tire upon which the fabric is placed. For example, by reference to Fig. 1, it will be observed that the upper hooks of the units are positioned practically at the lower corners of the rings to which said units are secured. If the fabric is placed upon a tire of greater width and diameter than that shown in Fig. 1, the said upper hooks of the units will position themselves at points farther removed from the lower corners of the connecting rings. It is on account of this characteristic that the fabric is termed "self-adjusting."

In the example shown, the diamond-shaped units have the hooks 4 formed only at the corners which are farthest removed from one another, but the triangular-shaped units have the hooks formed at all corners. The spaces between the mutually adjacent units as well as the spaces within the confines of the connecting rings are shown in the drawings of greater relative proportions than will be the case in actual practice. In actual practice they will be comparatively slight, so slight in fact, that the possibility of a projection entering therein rather than engaging against the armored area, is reduced to a minimum and, in fact, even though a projection were to enter any of the open spaces, it would be deflected by the units during the rapid movement of the tire before it could result in a puncture.

Having fully described my invention, I claim:

1. An armor fabric comprising rows of triangular armor units having overturned apex portions, and triangular rings connecting the mutually adjacent units of each row and of adjacent rows, said overturned apex portions being engaged over the straight sides of the triangular rings.

2. An armor fabric consisting of a plurality of armor units, the units of the central row being diamond-shaped and the units of the rows at each side of the central row being triangular-shaped, the units having overturned apex portions and triangular rings connecting the mutually adjacent units of each row and of the rows adjacent thereto, the said apex portions being engaged over the straight sides of the rings.

In testimony whereof I have hereunto set my hand in presence of two subscribing witnesses.

JOSEPH A. ZEMAN.

Witnesses:
F. O. KUCERO,
JOHN BARTLE.